United States Patent
Zetterström

(10) Patent No.: US 6,386,553 B2
(45) Date of Patent: May 14, 2002

(54) VEHICLE WHEEL SUSPENSION ARRANGEMENT

(75) Inventor: Sigvard Zetterström, Hakenäset (SE)

(73) Assignee: Volvo Personvagnar AB, Göteborg (SE)

(*) Notice: Subject to any disclaimer, the term of this patent is extended or adjusted under 35 U.S.C. 154(b) by 0 days.

(21) Appl. No.: 09/681,954

(22) Filed: Jun. 29, 2001

Related U.S. Application Data

(63) Continuation of application No. PCT/SE99/02476, filed on Dec. 23, 1999.

(30) Foreign Application Priority Data

Dec. 29, 1998 (SE) ................................................ 9804592

(51) Int. Cl.$^7$ .............................................. B60G 17/01
(52) U.S. Cl. ..................... 280/5.51; 180/65.5; 180/413; 280/5.516; 280/5.52; 280/5.522; 280/86.757; 280/86.758; 701/22; 701/41; 701/48
(58) Field of Search ................................ 280/5.5, 5.51, 280/5.516, 5.52, 5.521, 5.522, 5.523, 86.75, 86.751, 86.757, 86.758, FOR 112; 180/65.5, 412, 413, 443; 701/22, 41, 48

(56) References Cited

U.S. PATENT DOCUMENTS

| | | | | |
|---|---|---|---|---|
| 4,539,497 A | * | 9/1985 | Boyer | .................. 180/65.5 |
| 4,726,603 A | * | 2/1988 | Sugiyama et al. | ....... 280/5.522 |
| 5,087,229 A | | 2/1992 | Hewko et al. | |
| 5,150,763 A | | 9/1992 | Yamashita et al. | |
| 5,156,414 A | * | 10/1992 | Fayard et al. | ............ 280/86.75 |
| 5,428,532 A | * | 6/1995 | Yasuna | ................. 280/86.751 |
| 5,700,025 A | * | 12/1997 | Lee | ..................... 280/86.751 |

FOREIGN PATENT DOCUMENTS

| | | | | |
|---|---|---|---|---|
| DE | 4323024 | * | 1/1994 | ......... 280/FOR 112 |
| JP | 5-338446 | * | 12/1993 | ................ 180/65.5 |

* cited by examiner

Primary Examiner—Eric Culbreth
(74) Attorney, Agent, or Firm—Kilpatrick Stockton LLP

(57) ABSTRACT

An arrangement for the suspension of a wheel of an automotive vehicle is disclosed. The wheel is connected to a propulsion device for driving the vehicle and a braking device for braking each individual wheel. The invention has sensors for detecting at least the angular steering displacement of the vehicle required by the vehicle driver, two steering link arms fitted between said body and attachment points in the wheel, positioned on both sides of an imaginary vertical line running through the center of the wheel, and a control unit for processing signals from the sensors and for actuating the steering link arms for adjustment of the wheel in response to the signals and the current operating state of the vehicle. Through the invention, an improved, integrated wheel suspension unit for automotive vehicles is provided, particularly allowing dynamic wheel alignment adjustment and adjustment of the angular steering displacement of each individual wheel of the vehicle.

9 Claims, 3 Drawing Sheets

VEHICLE WHEEL SUSPENSION ARRANGEMENT

CROSS REFERENCE TO RELATED APPLICATIONS

This is a continuation patent application of International Application Number PCT/SE99/02476 filed Dec. 23, 1999 that designates the United States. The full disclosure of said application, in its entirety, is hereby expressly incorporated by reference into the present application.

BACKGROUND OF INVENTION

1. Technical Field

The present invention relates to a vehicular wheel suspension arrangement comprising a wheel connected to propulsion device for driving the vehicle, and a brake for braking each individual wheel. More specifically, the invention relates to a wheel suspension arrangement having one or more sensors for detecting at least the angular steering displacement of a vehicle required by the vehicle driver, at least two steering link arms fitted between the vehicle body and attachment points in the wheel, and a control unit for processing signals from the sensors and for actuating the steering link arms for adjustments of the wheel in response to the signals and the current operating state of the vehicle. The invention is particularly intended for use as an integrated wheel suspension unit for steering, propulsion and braking of the respective wheel of an automotive vehicle.

2. Background Information

In association with vehicles such as passenger cars, various types of suspension systems are used for the wheels and axles. Such wheel suspensions are arranged for allowing attachment and resilient suspension of the vehicle wheels, in turn, enhancing the comfort of the vehicle passengers and the road holding characteristics and service life of the vehicle.

A multitude of different types of wheel suspension are known. These suspensions are found in systems having, for example, rigid or split wheel axles that may be supplemented as required by spring members, shock absorbers and other components. In addition, force-absorbing link arms connecting the vehicle wheels to its body and anti-roll bars for reduction of excessive rolling motions of the vehicle are often utilized.

Further, vehicles are normally designed with the vehicle motive wheel axles connected to an engine such as a conventional gasoline or diesel combustion engine. The connection between the wheel axles and the engine is arranged via a gearbox and mechanical transmission devices. Furthermore, the vehicle wheels are provided with braking devices such as conventional disc or drum brakes, actuated by depression of the vehicle brake pedal. In this way, the brake devices at the wheels are actuated via a hydraulic brake line system.

Also, vehicles are normally provided with a steering device intended for giving the wheels a certain angular steering displacement when the driver is turning the vehicle steering wheel. The steering gear may have an input shaft with the steering wheel connected to it. The input shaft transmits the steering wheel movements to a pinion that in turn transmits the movements to a rack. The rack movements are then transferred to the vehicle wheels for steering the vehicle. This type of steering gear may be complemented by a servo power device having a hydraulic cylinder with a piston arranged on the steering rack. In this way, more power is applied onto the rack when turning the steering wheel.

The equipment described above for propulsion, wheel suspension, braking and steering is based on well-proven principles that are frequently used today in automotive vehicle design. Although these principles define a well functioning technique, they exhibit certain limitations. For example, fitting all the components mentioned above (i.e. engine, gearbox; transmission, spring arrangement, anti-roll bars, brakes, steering, etc.) into a relatively small space in the vehicle may prove to be a problem. Furthermore, there may be difficulty in securely and cost effectively interconnecting a large number of functions associated with the wheel suspension system. Specifically, there may exist a requirement for a high degree of integration of vehicle functions for suspension and propulsion of the respective wheel.

SUMMARY OF INVENTION

The present invention provides an improved vehicle wheel suspension arrangement, which could particularly be utilized as an integrated wheel suspension unit with functions primarily for steering, and preferably also for propulsion and braking, of each individual vehicle wheel. This is achieved by means of an arrangement as disclosed below.

The invention is comprised of an arrangement for an automotive vehicle wheel suspension in which a wheel is connected to both a propulsion device for driving the vehicle, and a braking device for braking of the individual wheel. The invention has one or more sensors for detecting at least the angular steering displacement of the vehicle required by the vehicle driver. Two steering link arms are fitted between the vehicle body and attachment points in the wheel, positioned on both sides of an imaginary vertical line running through the center of the wheel. Furthermore, the invention has a control unit for processing signals from the sensors and actuating the steering link arms for adjustment of the wheel in response to the signals and the current operating state of the vehicle.

The invention provides a number of advantages compared to conventional wheel suspension systems. Primarily, it should be noted that the invention constitutes a highly integrated wheel suspension arrangement allowing individual adjustment of steering displacement and wheel alignment of the respective wheels of a vehicle. In this way, individual steering of each vehicle wheel is allowed. Furthermore, a vehicle comprising the arrangement according to the invention can be designed without any conventional steering gear and/or steering column.

The invention is preferably arranged in connection with a computer-based control unit having software functions for dynamic adjustment of wheel alignment, in particular, the "camber" angle and the "toe-in" angle of each respective wheel. In this manner a vehicle constructed according to the invention can be designed without any conventional mechanical wheel alignment requirements. Furthermore, a vehicle equipped with the arrangement according to the invention may have a "joystick" or similar control device, thereby replacing the conventional steering wheel.

According to a preferred embodiment, the invention may include a propulsion device in the form of an electric motor, integrally arranged with each individual wheel. As such, the vehicle may be designed without a conventional combustion engine, gearbox or drive shaft connecting the individual wheel with the propulsion device found on the vehicle chassis. Further, no mechanical connections have to be fitted at the factory, which in turn simplifies and reduces the cost of production.

According to a preferred embodiment of the invention, a braking device is provided that is integrated into the electrical motor. This design removes the need for any conventional drum or disc brake arrangement.

Additionally, according to the embodiment there is a further link arm connected between the respective wheel and the vehicle body. The link arm is provided with a torsion spring unit for controlling a level adjustment of the wheel and for an anti-roll function of the wheel. In this way an advantage is achieved since the vehicle does not require the provision of any conventional, mechanical anti-roll bar.

Further advantageous embodiments of the invention are provided in the following detailed description.

BRIEF DESCRIPTION OF DRAWINGS

The invention will be described in further detail below, with reference to a preferred embodiment example and the appended drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
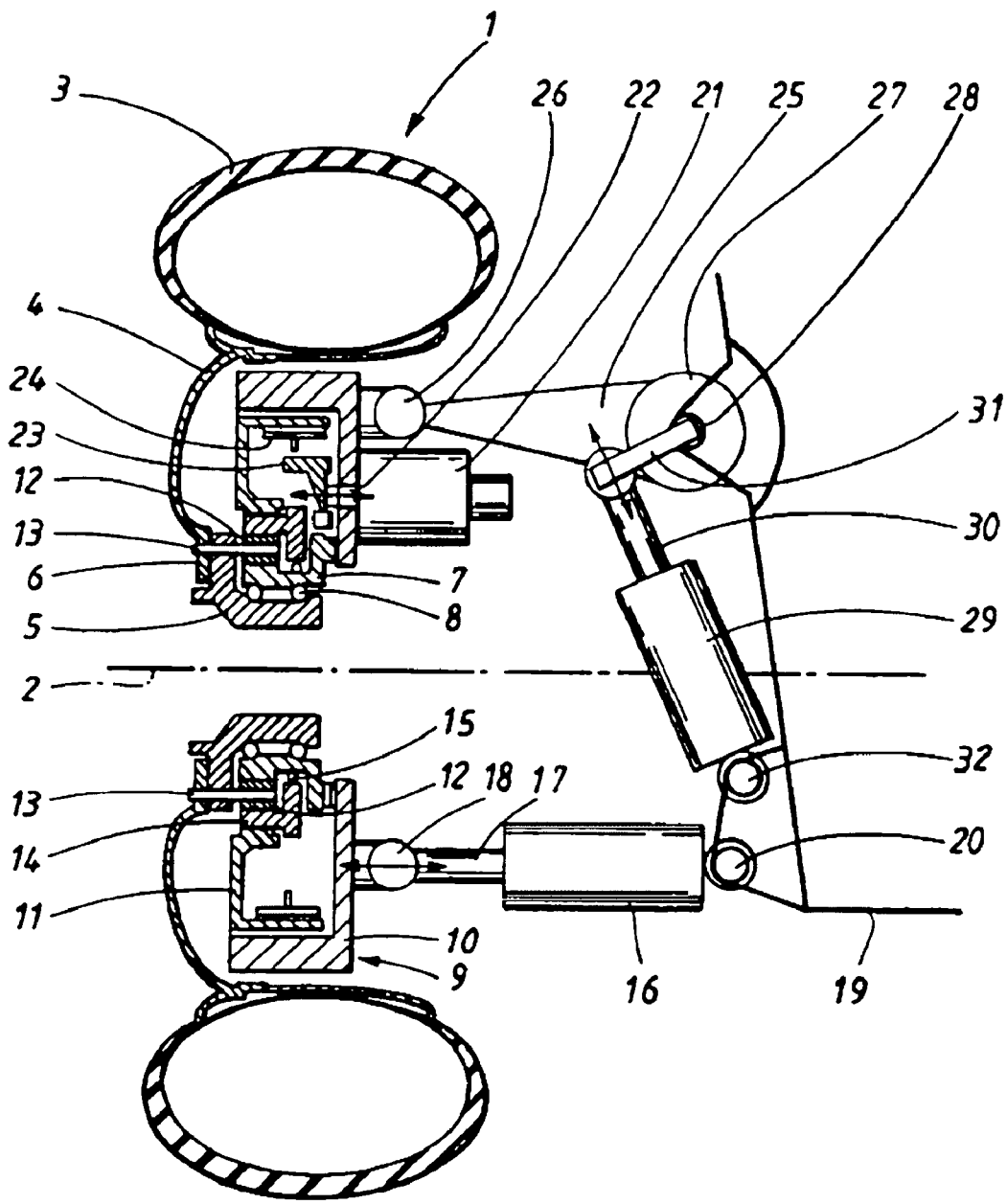
FIG. 1 illustrates a partial, cross-sectional side view, of an arrangement according to the present invention from the front of a wheel.

FIG. 1 shows a partial, cross-sectional side view of an arrangement according to the present invention. According to a preferred embodiment, the arrangement is utilized as a wheel suspension unit for an automotive vehicle, which preferably, but not necessarily, consists of a passenger car. The figure shows in principle how this wheel suspension unit according to the invention could be arranged at one of the four wheels of such a vehicle. Corresponding wheel suspension units would then preferably be provided for all wheels of the vehicle in question.

Referring to FIG. 1, the wheel 1 is conventionally arranged for rotation about an imaginary axis 2, and comprises a tire 3 and a hub 4. The hub 4 is rotationally suspended by means of a wheel bearing comprising an inner ring 5, which in turn is connected to the hub 4 via a flange 6, extending radially in relation to the axis 2. In a known manner, a number of wheel studs (not shown) may be inserted through the flange 6 and screwed tight into corresponding holes (not shown) in a surface of the inner ring 5 facing the flange 6. To this end, the flange 6 of the hub 4 is provided with threaded holes (not shown) for such wheel studs.

The wheel bearing mentioned above also comprises an outer ring 7 extending around the inner ring 5, and ball bearings 8 arranged between the inner ring 5 and the outer ring 7.

The invention further comprises a propulsion device integrated into the wheel 1, preferably consisting of an electric motor 9. The motor 9 has an armature 10 provided with motor coils (not shown) and is fixedly attached to the outer ring 7. The motor 9 additionally may have a rotor 11 enclosed by the armature 10. The rotor 11 rotates in relation to the outer ring 7 of the wheel bearing. The outer ring 7 is thus stationary. To this end, the outer ring 7 is designed like an annular sun gear having external teeth meshing with a multitude of planetary gears 12 arranged around the circumference of the outer ring 7. The number of planetary gears 12 is preferably three, of which two can be seen in FIG. 1.

FIG. 1 illustrates the invention in principle, and in a somewhat simplified form. In practice, the armature 10 should be connected to a separate component in the form of a hub carrier (not shown), which would then be bolted to the armature 10.

The planetary gears 12 should be located around the outer ring 7 at substantially the same pitch diameter as the above-mentioned wheel studs. Furthermore, each planetary gear 12 is rotationally supported on a planet carrier stud 13 impacted into a hole in the hub flange 6. To this end, the inner ring 5 of the wheel bearing is provided with through holes for passage of the respective planet carrier stud 13.

The rotor 11 is connected to each planetary gear 12 via a ring gear 14. This ring gear 14 is provided with internal teeth for meshing with the corresponding teeth of the respective planetary gear 12. The gear 14 is also provided with external splines for non-rotating connection with the rotor 11 by means of a press fit. The ring gear 14 is furthermore supported in relation to the outer ring 7 of the wheel bearing, more specifically, against the outside of the outer ring 7. This is indicated in FIG. 1 by further ball bearings 15. Thus, the outer ring 7 of the wheel bearing defines an inner race for the ring gear 14 of the planetary gear transmission.

The armature 10 is connected to two steering link arms 16. Only one steering link arm is shown in FIG. 1. According to what will be described in detail below, the steering link arms 16 define activation members functioning to provide dynamic wheel alignment adjustment of the wheel 1 depending upon the current operating state of the vehicle and the wheel 1. Examples of wheel alignment angles that might be considered for adjustment are the "toe-in" angle, i.e., an angle between the longitudinal axis of the vehicle and an imaginary plane along the wheel 1, and the "camber" angle, i.e., the angle of inclination of the wheel 1 in relation to an imaginary plane extending perpendicularly to an underlying roadway. Additionally, each steering link arm 16 is functioning to provide a dynamic adjustment of an angular steering displacement of the wheel 1, depending upon both driver intent during driving and the current operating state of the vehicle and the wheel 1. For adjustment of the wheel 1, each steering link arm 16 is provided with a displaceable rod 17 that can be actuated to be both extended out of and withdrawn into the respective steering link arm 16, indicated by an arrow in FIG. 1. The rod 17 is then actuated by a drive member, preferably in the form of an electric axial motor, that is an integral component in each steering link arm 16 (not shown in detail in FIG. 1). The rod 17 is rotationally connected to the armature 10 via a pivoting joint 18. Preferably, the attachment of the respective rod 17 is made by means of a rubber bushing, as the angles concerned are normally relatively small. Alternatively, the attachment of the respective rod 17 could be made via a ball joint.

The electric axial motor is a known type of drive member and will not be described in detail here. As explained below, the respective axial motor can be actuated by means of a computer-based control unit for adjustment of the wheel alignment and the required steering displacement of each individual wheel.

Each steering link arm 16 is fastened to the vehicle body 19 via additional attachment points 20 (of which only one attachment point is shown in FIG. 1). Preferably, each attachment point 20 includes a rubber bushing.

According to the embodiment, the arrangement according to the invention comprises a braking device in the form of a brake actuator 21 arranged at the armature 10. Also, the brake actuator 21 preferably comprises an electric, linear axial motor, which functions upon actuation to act upon a displaceable brake rod 22, which in turn abuts against a pivoting member 23 that is suspended in the armature 10. Upon actuation of the brake actuator 21, the brake rod 22 causes the member 23 to pivot forcing a brake shoe 24 against an internal cylindrical surface of the rotor 11. The brake shoe 24 is provided with a brake lining manufactured from a material exhibiting a high friction against the interior surface of the rotor 11. As such, a drum brake function is achieved enabling the rotor 11 to be braked. According to what will be explained below, this function may be actuated through depressing a brake pedal located in the vehicle.

During operation of the engine 9 and therefore rotation of the wheel 1, the planetary gearing in the hub is used for increasing the rotational speed of the rotor 11 to about twice that of the wheel. In this way, the torque requirement during propulsion by the engine 9 can be reduced, which is an advantage. The planetary gears 12 roll against the stationary outer ring 7. The respective carrier studs 13 of the planetary gears 12 are arranged in the inner ring 5 of the bearing, rotating at about half the speed of the rotor 11. Through the aid of the planetary gearing, only about half of the force of the stepped-up rotor 11 is required during propulsion or braking of the wheel 1 versus if the rotor 11 had been fixedly arranged directly onto the hub of the wheel 1.

Further, according to one embodiment, the armature 10 is connected to a second link arm in the form of a level link arm 25 that is pivotally mounted to the armature 10 in a similar fashion as the steering link arms 16 mentioned above, via a further attachment point 26 in the form of a rubber bushing or, alternatively, a ball joint. The level link arm 25 functions to provide level regulation and anti-roll of the wheel 1. To this end, the level link arm 25 comprises an integral torsion spring unit 27, which in turn is arranged around a through axle 28, thereby defining an attachment into the vehicle body 19, preferably extending substantially in the longitudinal direction of the vehicle. The torsion spring unit 27 is preferably made of rubber or a material having similar resilient properties. The attachment to the body 19 is preferably realized through rubber bushings (not shown), whereby the wheel 1 can be provided with a required rigidity in the transversal and longitudinal directions. In doing so, good performance regarding sound and vibration insulation in the vehicle is provided.

Through a suitable adaptation of the material properties and the construction of the torsion spring unit 27, a level control of the wheel 1 is provided, that is, a control of the setting of the vertical position of the wheel 1 in relation to the body 19. Furthermore, with the aid of the torsion spring unit 27, the level link arm 25 will function like an anti-roll bar for the cushioning of excessively large rolling motions of the vehicle. In order to optimize the road-holding properties of a vehicle, the stiffness of the torsion spring unit 27 may be tuned to achieve a good anti-roll function.

In order to simply and efficiently optimize the anti-roll function of the torsion spring unit 27 to a current operating state of the vehicle, the unit 27 might be based on the use of an electro-rheological fluid. According to a known technique, such a fluid can be used in resilient elements whereby a relatively high electrical tension is applied over a certain amount of electro-rheological fluid to influence its viscosity. In this way, the torsion spring unit 27 can be utilized for an electrically controlled, active cushioning.

In order to further enhance the level control function and anti-roll function of the invention, the level link arm 25 may preferably be connected to a control lever 29 including an additional electrical axial motor (not shown). The control lever 29 includes a rod 30 that can be actuated by this axial motor for displacement back and forth, as indicated by an arrow in FIG. 1. The rod 30 is pivotally suspended in a link rod 31, which in turn is fixedly attached to the shaft 28 to which the torsion spring unit 27 is fastened. Further, the control lever 29 is pivotally mounted to the vehicle body 19 via an additional pivoting joint 32. In this manner, the control lever 29 may be utilized for providing a certain preload to the torsion spring unit 27, which is provided by means of appropriate operation of the link rod 31. Through this, a variable level retention of each wheel 1 is enabled. Besides this, an active "anti-lift" and "anti-dive" function of the vehicle is enabled, i.e., the tendency of the vehicle body to lift at the rear and at the front, during braking and acceleration can be efficiently counteracted. Furthermore, in this way rigidity against "rolling" motions of the vehicle is achieved, i.e., tendencies of unwanted rotation around the longitudinal axis of the vehicle is counteracted.

According to the invention, the torsion spring unit 27 is provided with a variable preloading device. In case the torsion spring unit 27 consists of a rubber spring, this preloading device could comprise a rotating inner sleeve (not shown). The level control is then achieved by rotation of the inner sleeve, whereby the force at the end of the link arm 25 connected to the wheel 1 can be increased or decreased.

As such, the level link arm 25 transfers a resilient force from the torsion spring unit 27. It may also transfer an anti-roll force from the torsion spring unit 27 and its preloading device, which may take place dynamically, e.g., while driving through curves. Furthermore, the level link arm 25 transfers a level-controlling force from the torsion spring unit 27 and its preloading device, which best takes place in connection with a load change of the vehicle.

According to the description below, the arrangement is provided with a number of sensors for various parameters defining the current operating state of the vehicle and its wheels. These sensors (not shown in FIG. 1) are used for controlling the steering link arms 16, the level link arm 25 and the control lever 29.

Figure 2:
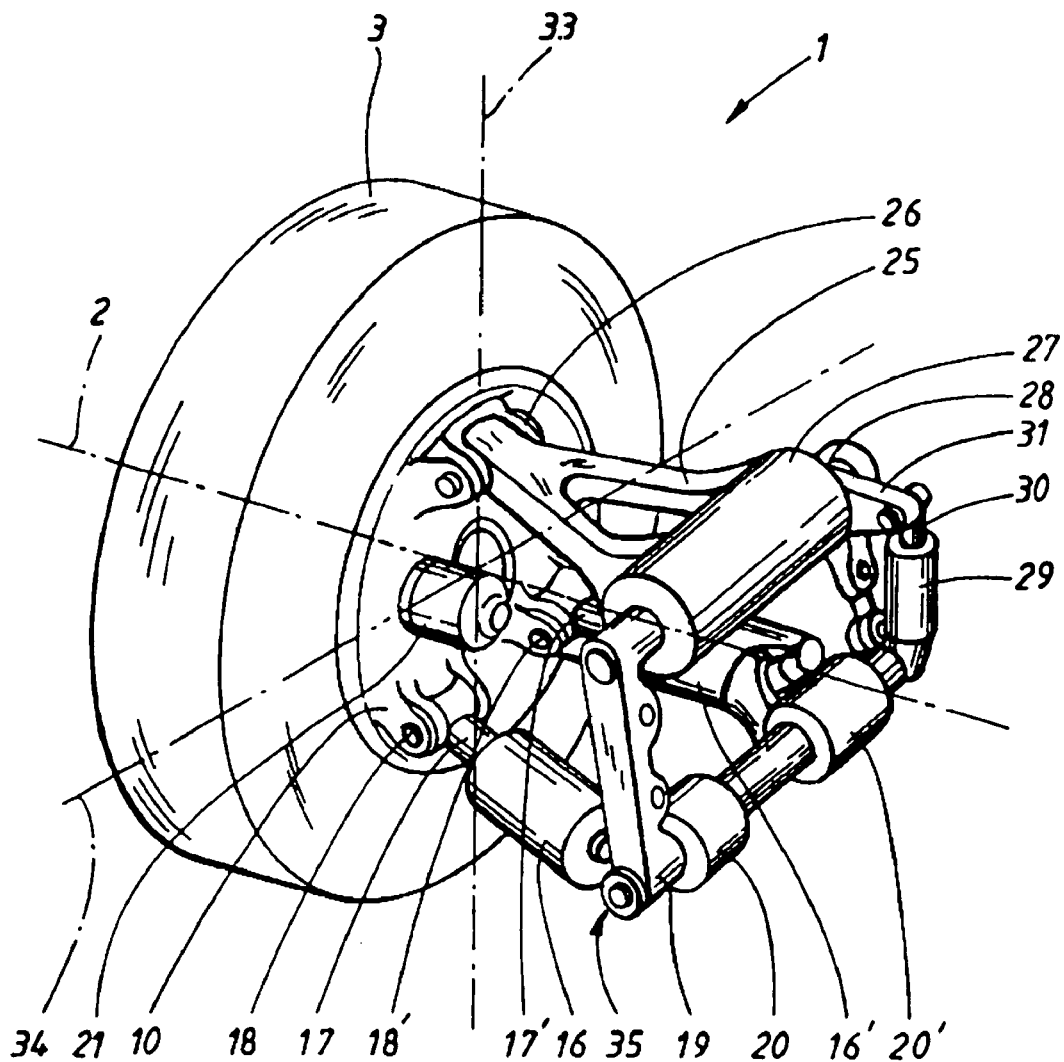
FIG. 2 illustrates a perspective view of how the arrangement according to the invention could be arranged in practice on a vehicle.

FIG. 2 illustrates from a perspective view one embodiment of how the arrangement according to the invention could be arranged in practice. As illustrated, two steering link arms 16, 16' are fastened to the body 19 through at least two rubber bushings 20, 20'. The steering link arms 16, 16' are substantially identical in shape and are pivotally attached via rods 17, 17', respectively, to attachment points 18, 18' in the armature 10, arranged along substantially the same horizontal plane. More particularly, the steering link arms 16, 16' are attached on each side of an imaginary vertical line 33 running through the center point of the wheel 1. The steering link arms 16, 16' are further attached below an imaginary horizontal line 34 running substantially in parallel with the underlying roadway and through the center point of the wheel 1. However, the invention is not limited to this location of the steering link arms 16, 16', but may be attached above the horizontal line 34.

Referring to FIG. 2, the torsion spring unit 27 is arranged around the axle 28, which is in turn connected to the vehicle chassis 19 as explained above. The link rod 31 is also fastened to the axle 28. The link rod 31 can thus be actuated by the control lever 29 and its associated rod 30 for controlling the level-regulation and anti-roll functions of the torsion spring unit 27. FIG. 2 illustrates a practical embodiment in which the link rod is arranged extending in a direction away from the wheel 1, as an alternative to what is shown in FIG. 1, where the link rod 31 is shown extending in a direction towards the wheel 1. Thus, both of these alternatives are conceivable within the scope of the invention.

The attachment of the two steering link arms 16, 16', the level link arm 25 and the control lever 29 is made to the vehicle body 19 as discussed above. Referring to FIG. 2, that part of the body 19 to which the attachment is made preferably consists of a frame-like member 35 serving as a dedicated attachment component. This member 35 facilitates assembly of the arrangement onto a vehicle. Through the frame element 35, the retaining of the components as one single unit is also enabled. Furthermore, the frame element 35 makes it possible to reduce the requirements for accurate tolerances of the attachment points against the body.

Preferably, the two steering link arms 16, 16' are symmetrically arranged on the individual wheel of the vehicle. This allows for the use of identical wheel suspension units in the respective corners of the vehicle.

Figure 3:
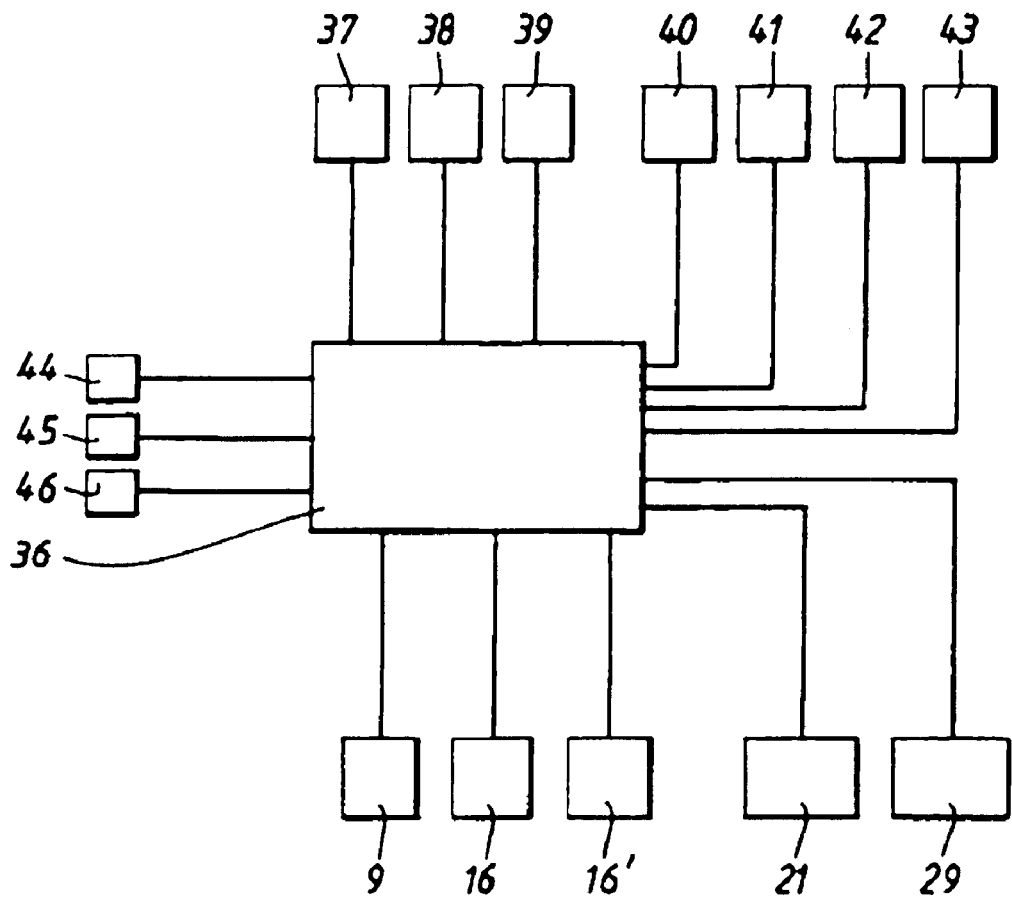
FIG. 3 illustrates a block diagram of the structure of the invention.

FIG. 3 shows in the form of a block diagram how the arrangement could be arranged and utilized in a vehicle. Here, the arrangement is utilized as an integrated wheel suspension unit for electrical control of propulsion, angular alignment, steering and braking of each individual wheel of the vehicle. Preferably, four substantially identical wheel suspension units are used for each respective wheel of the vehicle. Each wheel may then be controlled independently of the others with respect to torque and wheel alignment.

The invention is based upon the two steering links 16, 16' being controlled by a computer-based control unit 36, which functions in receiving a number of signals from a corresponding number of sensors. In this embodiment, the invention has a first sensor 37 that generates a signal corresponding to the driver's requirement for the angular steering displacement, or the steering wheel angle of the vehicle. Such a sensor 37 may be an integrated angle sensor in a conventional steering wheel or alternatively, may be comprised as part of a "joystick" or similar steering control device. Regardless of the embodiment used, a signal from this first signal 37 corresponding to the driver's steering commands is fed to the control unit 36.

The first sensor 37 is preferably provided with a unit for feedback of a force that provides a resistance or a movement of the steering control device corresponding to the steering displacement of the vehicle wheels. As an example, such a feedback force might be provided an electrical motor arranged in the steering control device. In this way the driver is given the feeling of a mechanical connection between the steering wheel and the wheels.

Further, there is a second sensor 38 in the form of a force sensor arranged in connection with each wheel of the arrangement. This second sensor 38 is connected to the control unit 36 and emits a signal corresponding to a measurement of the force from the underlying roadway acting on the respective wheel. Such a force sensor 38 is preferably arranged as close to each wheel as possible and would, for example, consist of a strain gauge sensor fitted in the wheel bearing discussed above. This sensor can be used for detecting transversal forces acting on the wheel, allowing the rolling resistance to be minimized by an appropriate alignment setting of the wheel. The force sensor 38 can also be used for detecting longitudinal forces acting upon the wheel, i.e., forces acting in the longitudinal direction of the vehicle.

Furthermore, there is a third sensor 39 in the form of a position sensor arranged in connection to each wheel. This third sensor 39 emits to the control unit 36 a signal corresponding to a measurement of the wheel level in relation to the body (i.e., the vehicle ground clearance). The sensor may also be utilized for detecting the roll angle of the vehicle (that is, to what degree the vehicle is rotating around its longitudinal axis). The suspension movement sensor 39 is preferably arranged between the upper link arm 25 and the body 19 (compare FIG. 1).

With the signals emitted from at least the first sensor 37, preferably also the second and third sensors 38, 39, to the control unit 36, an appropriate setting of steering displacement and wheel alignment of each wheel can be performed in response to the current operating conditions of the vehicle. To achieve this, the control unit 36 includes a data storage memory containing tables that, depending on different input data from the first sensor 37, second sensor 38 and third sensor 39, calculates output values for control of the function of the steering link arms 16, 16'. For example, the signal from the first sensor 37 is utilized for the adjustment of a required angular steering displacement of each wheel.

The invention can be utilized for actively controlling the wheel alignment (e.g., the camber and toe-in angles) in order to optimize these in response to current operating conditions of the vehicle. For example, current transversal forces on the wheels, wheel positions, and other operating parameters of the vehicle, such as its speed and fuel consumption, can then be considered. The invention can be used for providing optimum fuel economy, by continuously optimizing the wheel alignment thereby minimizing the rolling resistance of each wheel. The invention can also be used, e.g., to counteract the influence of side wind against the vehicle with a wheel alignment adjustment and a steering displacement that is adapted to the least possible drag resistance. This will also positively influence the fuel consumption. In this case, the control unit 36 aligns the wheels so as to minimize the transversal forces acting upon each individual wheel, those forces in turn being detected by the force sensors 38. Further, the transversal stability of the vehicle can be adapted through a continuous adjustment of the camber angle of each wheel. Such a function may, for example, be used by the driver to select by a suitable control member, if an active or a more comfortable driving style is preferred. Depending on the driving style selected and fed to the control unit 36, the corresponding wheel settings can be set. Furthermore, for continuous level regulation and control of the anti-roll function, a control of the above control levers 29 may be utilized.

Preferably, the system also comprises a fourth sensor 40 in the form of a brake sensor. This sensor 40 is preferably arranged in connection with a brake pedal (not shown) in the vehicle with signals from the brake sensor 40, the brake actuator 21 can be applied when the driver wishes to brake the vehicle. The invention can also be used for applying the wheel brakes by non-driver-induced braking actions, which may occur when anti-spin and ABS functions are required in the vehicle. Preferably, the functions of the respective brake actuators 21 and the respective electrical motors 9 are coordinated during this type of control of propulsion and braking of the wheels.

Other kinds of sensors may be of interest for detecting the current driving conditions of the vehicle and its wheels. For example, a fifth sensor in the form of an accelerometer 41 may be used for feeding a signal corresponding to the current vehicle acceleration to the control unit 36. Further, there may be a sixth sensor 42 connected to the control unit 36, for indicating the driver's throttle actuation for controlling the torque of the individual electrical motors.

As discussed above, the invention functions in controlling the wheel alignment and angular steering displacement of the individual wheels. Furthermore, the control unit 36 functions in response, for example, to a measurement of the driver's throttle actuation, which could be detected by the sixth sensor 42 as a position sensor for a throttle pedal, to control the motor in each individual wheel so as to obtain an intended speed of the vehicle. This type of control will not be described in detail here. However, it should be noted that the brake arrangement is preferably functioning in such a way that regenerative braking by the respective electrical motor is performed before friction braking via the brake shoe 24 is initiated.

Further, a seventh sensor 43 for transmitting a measurement of the rotational speed of each wheel may be connected to the control unit 36. In this manner, the invention can be used (particularly at high vehicle speeds) for optimization of the wheel alignment in order to provide a high degree of stabilization of the vehicle. This seventh sensor 43 may be used for calculation of the vehicle speed and the rotational changes of the individual wheels. Based upon signals from the seventh sensor 43, for example, a driving or a braking force may be applied to an individual wheel in case an anti-spin and/or ABS function is required. Furthermore, such signals can be used for registering the road friction during slippery conditions.

In order to enable exact control of the steering link arms 16, 16', these components are preferably each provides with a position sensor 44 and 45 for transmitting signals to the control unit 36 that corresponds to a measurement of the position of each rod 17, 17' of the steering link arms 16, 16', i.e., a measurement defining how far each rod 17, 17' has been extended out of its associated steering link arm 16, 16'. Preferably, the control lever 29 is also provided with a corresponding position detector 46 that, in like manner, sends a signal to the control unit 36 corresponding to a measurement of the current position of the rod 30 associated with the control lever 29.

Other sensors may also be utilized in connection with the invention. For example, transversal accelerometers (at the front and rear of the body) can be used for detecting the momentary transversal acceleration of the vehicle. Furthermore, a yaw angle sensor may be used for detecting the vehicle body rotational movement as seen from above, i.e., for detecting any skidding tendencies of the vehicle. Also, air speed sensors may be used at the front corners of the vehicle for indicating air drag and wind direction. Signals from such sensors could then be used for controlling the alignment of the individual wheels of the vehicle in a suitable way during travel, thereby minimizing drag.

Consequently, the invention can be used for individual settings of angular steering displacement and wheel alignment for each wheel of a vehicle. Following, it will be explained how the invention can be used during various operating conditions of a vehicle.

The camber angle of each wheel influences the transversal stability of the vehicle. In order to set a suitable camber angle of a given wheel, a set point for the angle may be calculated using the level positions at the right and left hand sides of the vehicle. As such, a signal from the first sensor 37, indicating the steering displacement of the vehicle steering wheel, and a signal from the second sensor 38, indicating the transversal force acting on the wheels, are also considered. Preferably, a signal indicating the transversal acceleration acting on the body is also utilized. If, for example, the elevation is the same for the right and left sides of the vehicle, the selected steering wheel position corresponds to driving straight ahead, and the transversal forces on the wheels and the transversal acceleration is substantially zero, one can assume that the vehicle is driven straight ahead without any inclination in relation to the horizontal plane. If this is the case, the steering link arms 16, 16' can be adjusted to make the camber angle for each wheel somewhat negative, resulting in good vehicle transversal stability. A negative camber angle is defined as the top of the wheel being somewhat inclined towards the vehicle.

As the wheel moves resiliently in and out over road obstacles without any turning of the steering wheel and transversal acceleration occurring that affects the vehicle, the steering link arms 16, 16' do not have to be activated for adjustment of the wheel camber angles. If, on the other hand, the elevation is different for the right and left side vehicle wheels at the same time as the steering wheel is turned and the vehicle is subjected to transversal acceleration, corresponding to the car entering a curve, then the camber angle is preferably adjusted so as to place the wheel theoretically vertical relative to the roadway.

Further, the toe-in angle of each wheel can be adjusted with the aid of a measurement of the transversal forces on the wheel according to what is being detected by the second sensor 38. Here, the fact that the transversal wheel forces should be minimized in order to achieve the lowest possible rolling resistance is considered. Preferably, signals from the first sensor 37, the yaw angle sensor, and the transversal accelerometers would also be utilized during this kind of adjustment.

Furthermore, the invention can be used to make the vehicle run level during curve negotiation. In this case, the steering wheel angle sensor 37, level sensor 39 and preferably a speed sensor for each wheel is utilized. During this operating state, the control unit 36 is used to calculate what degree the control lever 29 should be activated for preloading the torsion spring unit 27 in order to make the car run substantially level when driving through a curve.

When driving with a side wind against the vehicle body, the invention can be used for counteracting the force acting upon the vehicle. In a strong side wind, the force sensors 38 at the wheels are affected without the body being influenced by any transversal acceleration while the steering wheel is in a position corresponding to driving straight ahead. As long as such a transversal force exists, the respective steering link arms 16, 16' are controlled in such a way that the wheels at the front and rear are steering so as to make the car still run straight ahead yet slightly diagonally (a so-called "dog walk"), i.e., the body is turned somewhat into the wind. The wheel force sensors, the body yaw angle sensor and the transversal accelerometers will respond to side wind changes, gusts of wind and during overtaking, which quickly changes the incoming force of the side wind. The control unit may then function in initiating a quick counter-steering of the wheels to minimize yaw and drift.

During special operating conditions, such as parking, the invention could be used for four-wheel steering, facilitating the maneuvering of the vehicle. Four-wheel steering can be used for decreasing the turning circle of the vehicle as well as for enhancing its high-speed stability. For example, a diagonal movement away from or towards a curb could be performed in connection with a parking maneuver.

According to the invention, four-wheel steering may be automatically activated if required, preferably while driving the vehicle at a speed below a certain limit (detectable through the wheel rotational speed sensor 43). When driving at relatively high speeds, the invention can also be used for steering the rear wheels somewhat, thereby contributing to a high stability of the vehicle.

Another example of an application of the invention is when the vehicle is heavily loaded and there are requirements for adapting the height level of the chassis above the roadway in response to the weight of the load. This level adaptation could be performed through appropriate control of the control levers 29 mentioned above.

Other embodiments of the invention may be recognized. For example, the invention could be achieved using a conventional engine, e.g., a combustion engine provided in the vehicle chassis and connected to the vehicle drive wheels via a conventional mechanical connection. Further, a conventional braking device could be utilized as an alternative to the above-mentioned electrical brake. Further, the invention can be utilized in various types of vehicles, such as passenger cars, trucks and buses.

The invention in its simplest form can be implemented with the two steering link arms 16, 16', which are then arranged as discussed above, that is, fitted between the vehicle body and attachment points at each wheel, located on both sides of an imaginary vertical line running through the center of the wheel. The minimum sensors used by the invention are, in this case, a sensor for the steering wheel angular displacement by the driver. Preferably, the above-mentioned position sensors 44, 45 for sensing the positions of the rods 17, 17' of the two steering link arms 16, 16', would also be used. Such an arrangement would allow control of the angular steering displacement and the wheel alignment, e.g., the camber angle, of each individual wheel.

In principle, the electrical devices for propulsion and braking could be replaced, completely or in part, by hydraulic power transmission devices (steering link arms, spring, level control, anti-roll and shock-absorber elements and wheel motors), without departing from the basic principle of the invention. For example, the electrical axial motors mentioned above could be replaced by hydraulic cylinders. In the case of electrical actuators being used, these should be made self-braking in order to absorb transversal forces acting on the wheels during driving.

In case the electrical propulsion is replaced by hydraulic propulsion, the function of the planetary gear arrangement would best be reversed in comparison to what has been described above. In this alternative embodiment, hydraulic motors would be connected to the planetary gears, doubling the rotational speed of the car wheels. With hydraulic propulsion, a number of components such as hydraulic pumps, valves and lines would also be added. The friction brake mentioned above would however be eliminated, as the hydraulic motors could be shut off completely, if required, so as to lock the wheels into a stationary position.

The above-mentioned braking arrangement could be realized in various ways. As an example, the brake lining could be arranged to act on the exterior of the rotor instead of its interior. One advantage of this arrangement would be that excess frictional heat generation is avoided in that portion of the rotor acting as a motor. Alternatively, the rotor might also be arranged so as to enclose the armature, i.e., the rotor would rotate closest to the wheel rim, thereby increasing the possibilities for efficient cooling of the motor.

The torsion spring unit 27 may be based on, e.g., a rubber spring or a steel spring.

According to a further alternative embodiment, the comfort properties of the vehicle in question may be enhanced by interconnecting the two steering link arms in such a way that they follow each other in the vertical direction but are substantially independent of each other in the horizontal direction.

Furthermore, the spring rate of the torsion spring unit could be made progressive, rendering increased spring hardness to a relatively heavily loaded vehicle.

According to a further alternative embodiment, the level link arm could be provided at an extended portion of the armature 10 (a so-called "swan neck"), placing the top attachment point of the level link arm at a point above the tire. This would provide longer leverage for absorbing transversal forces on the wheel.

A parking brake function could further be obtained through an activation of the electrical brakes, conceivably in combination with placing all the wheels at an angle relative to each other, or a "stemming position". This would make the vehicle difficult to roll and to tow away.

The torsion spring unit could alternatively be of the hydro-pneumatic type, allowing also for anti-roll and level control functions.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. An arrangement for a suspension of a wheel of a vehicle comprising:

a propulsion device connected to said wheel for driving the vehicle, said propulsion device comprising an electrical motor arranged in association with said wheel;

a braking device for braking said wheel, said braking device being integrated into said electrical motor;

one or more sensors for detecting at least an angular steering displacement of the vehicle required by the vehicle driver;

an additional sensor for indicating a degree of application of said braking device required by the vehicle driver;

at least two steering link arms fitted between a vehicle body and attachment points in said wheel and positioned on both sides of an imaginary vertical line running through the center of said wheel; and a control unit for processing signals from said sensors and for actuating said steering link arms for adjustment of said wheel in response to said signals and the current operating state of the vehicle.

2. An arrangement for a suspension of a wheel of a vehicle comprising:

a propulsion device connected to said wheel for driving the vehicle;

a braking device for braking said wheel;

one or more sensors for detecting at least an angular steering displacement of the vehicle required by the vehicle driver;

at least two steering link arms fitted between a vehicle body and attachment points in said wheel and positioned on both sides of an imaginary vertical line running through the center of said wheel;

a further link arm fitted between said wheel and another attachment point on the body, said link arm comprising a torsion spring unit for control of a lever setting of said wheel and for an anti-roll function of said wheel; and a control unit for processing signals from said sensors and for actuating said steering link arms for adjustment of said wheel in response to said signals and the current operating state of the vehicle.

3. The arrangement according to claim 2, said propulsion device further comprising an electrical motor arranged in association with said wheel.

4. The arrangement according to claim 3 wherein said braking device is integrated into said electrical motor.

5. The arrangement according to claim 2 further comprising additional sensors for detecting the force acting upon the wheel and for detecting the level of the wheel in relation to the vehicle body.

6. The arrangement according to claim 2, said steering link arms further comprising an electrically actuated axial motor including a displaceable rod connected to said wheel.

7. The arrangement according to claim 2, said torsion spring unit further comprising an electro-rheological fluid for active control of a spring force with which said link arm acts upon said wheel.

8. The arrangement according to claim 2 further comprising a control lever connected between said body and said further link arm, wherein said control lever is operable for preloading the spring force of said further link arm.

9. A vehicle comprising an arrangement according to claim 2.

* * * * *